Jan. 30, 1945.   J. O. HUNT   2,368,546
CONTROL MECHANISM
Filed March 31, 1943   5 Sheets-Sheet 1
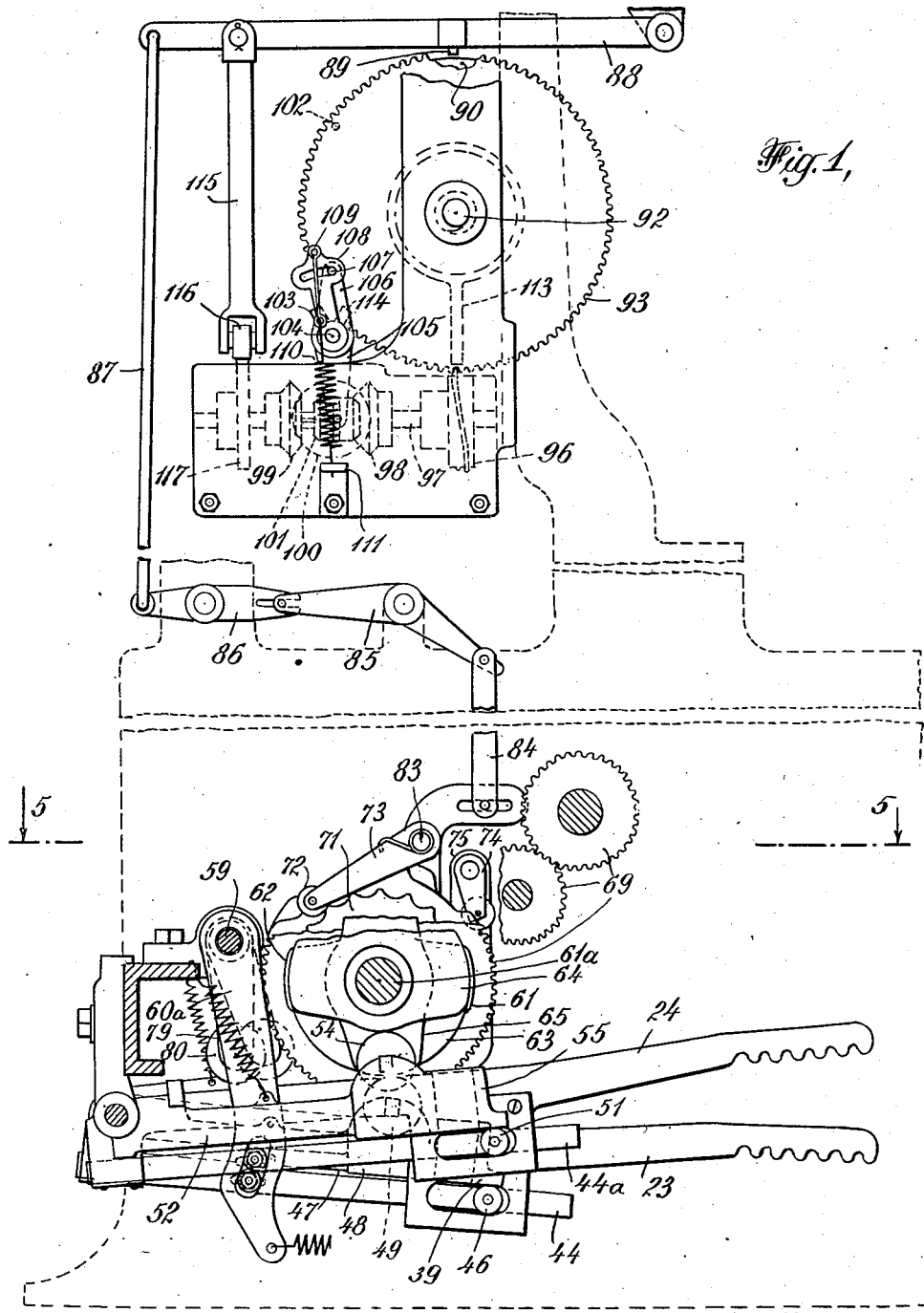
Fig. 1,
INVENTOR
John O. Hunt
BY
ATTORNEYS Jan. 30, 1945.  J. O. HUNT  2,368,546
CONTROL MECHANISM
Filed March 31, 1943  5 Sheets-Sheet 2
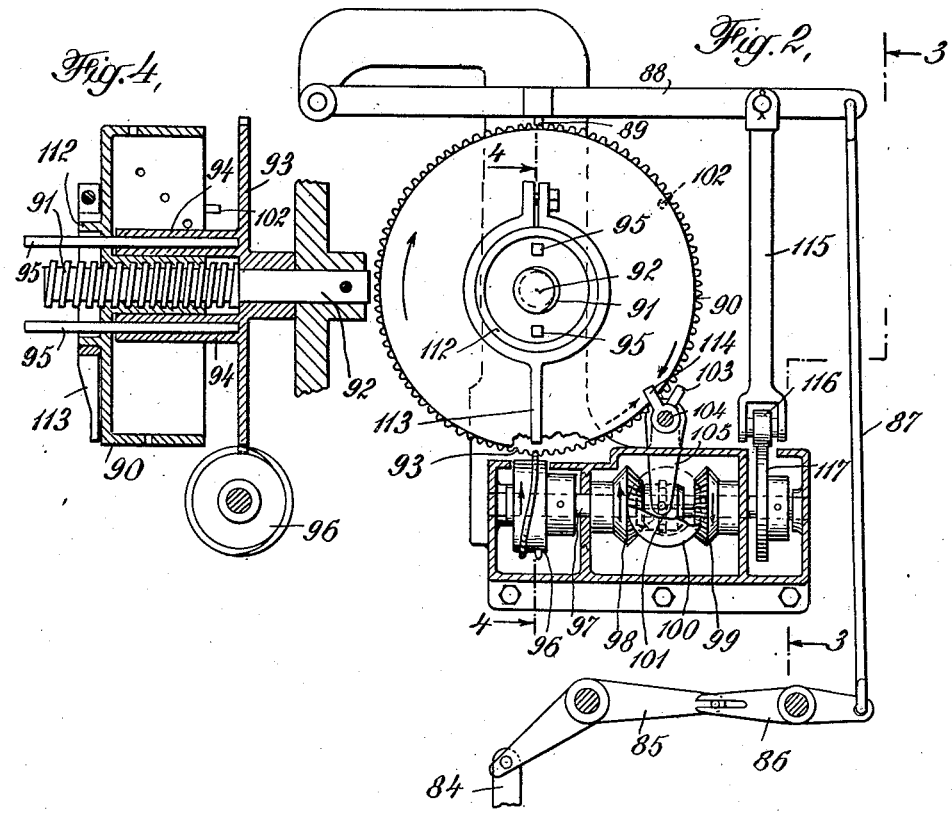
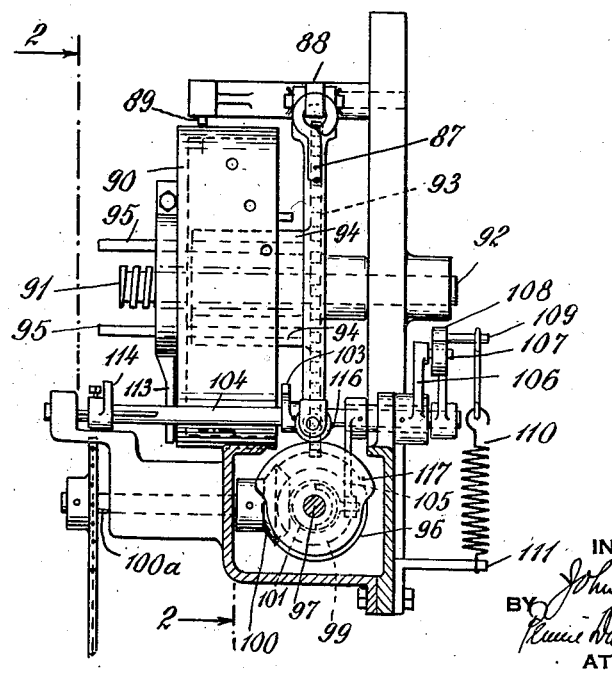
INVENTOR
John O Hunt
BY
ATTORNEYS Jan. 30, 1945.   J. O. HUNT   2,368,546
CONTROL MECHANISM
Filed March 31, 1943   5 Sheets-Sheet 3

INVENTOR
John O. Hunt
BY
Pennie Davis Marvin Edmonds
ATTORNEYS

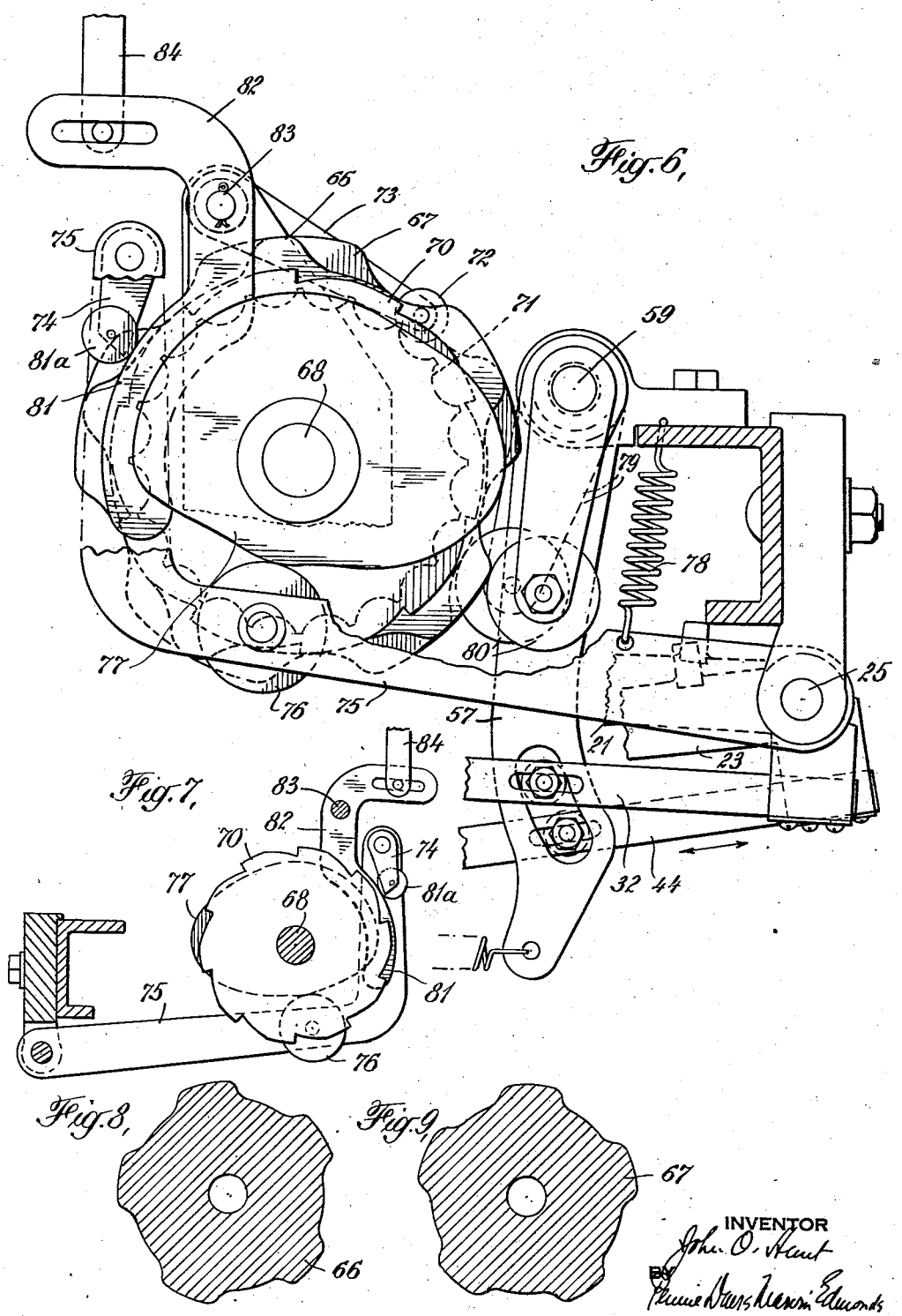

Jan. 30, 1945.  J. O. HUNT  2,368,546
CONTROL MECHANISM
Filed March 31, 1943  5 Sheets-Sheet 5
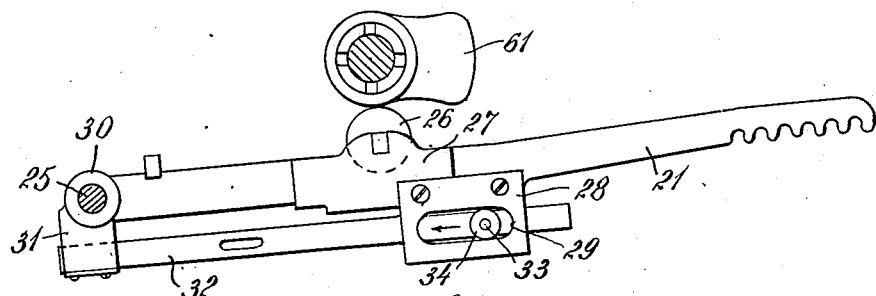
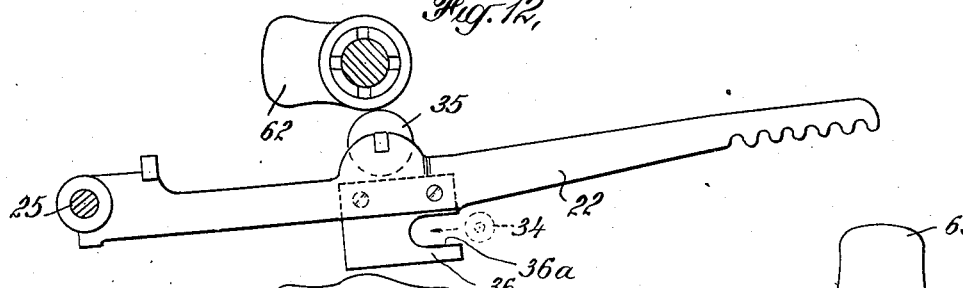
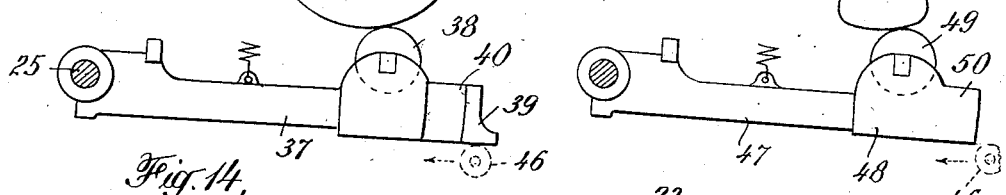
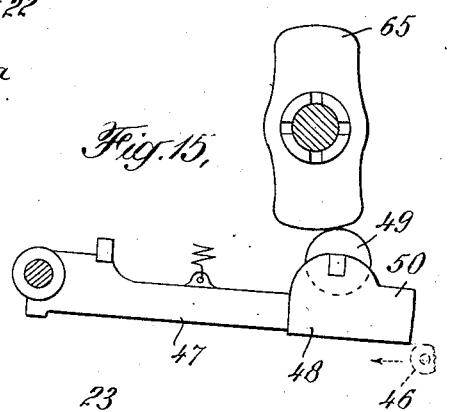
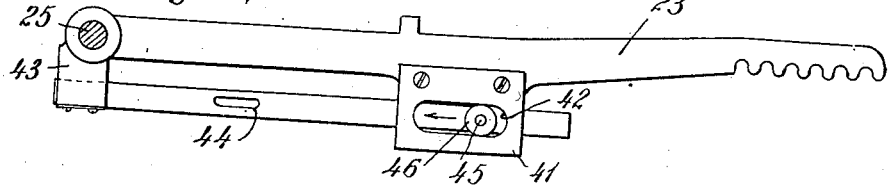
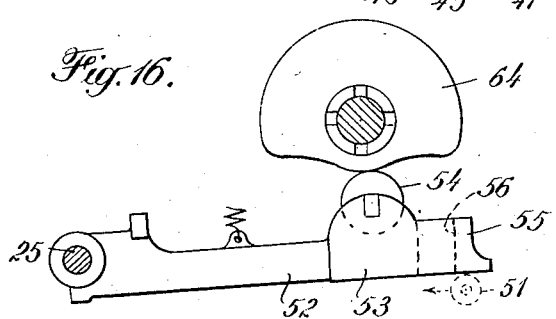
INVENTOR
John O. Hunt
BY
ATTORNEYS Patented Jan. 30, 1945

2,368,546

UNITED STATES PATENT OFFICE 2,368,546

CONTROL MECHANISM

John O. Hunt, Greenville, S. C., assignor to Ware Shoals Manufacturing Co., Ware Shoals, S. C., a corporation of South Carolina Application March 31, 1943, Serial No. 481,247

7 Claims. (Cl. 139—79)

This invention relates to mechanism for controlling the functioning of a machine capable of performing more than one operation, the control mechanism automatically causing a shift in the functioning of the machine from one operation to another at predetermined times and thus determining the duration of each operation. The new control mechanism may be employed for various purposes and affords special advantages when used for controlling the operation of a loom capable of weaving fabrics of different types, as, for example, both tubular and plain goods. When employed in conjunction with such a loom, the control mechanism determines the lengths of the respective sections of plain and tubular fabric produced and may be so adjusted that a wide variation in the lengths of the sections is possible. The new mechanism will, accordingly, be illustrated and described in a form suitable for use with a loom of the type mentioned, although it will be understood that the utility of the mechanism is not confined to loom control.

Looms for use in the production of both plain and tubular goods are commonly provided with four heddle frames which are raised and lowered by treadles actuated, directly or indirectly, by cams. When such a loom is weaving plain goods, the treadles are actuated in pairs, with one pair rising as the other pair descends, and vice versa. When tubular goods are being woven, the treadles function differently, so that in each shed, there are three sets of warp threads controlled by respective heddles at one side of the shed and one set at the other. Two separate webs are thus produced, the webs being connected at their selvages. The loom is provided with means for actuating the treadles in the two different ways and the control mechanism of the invention may be used to control such actuating means to determine when a shift in the operation of the loom will occur and to effect the shift.

The new control mechanism includes a drum which is driven in synchronism with the loom and is provided with a series of pattern areas arranged in a helical path. During the operation of the loom, the drum is rotated and moved endwise with a step by step movement and the pattern areas in the series are thus brought successively to a station at which reading means are located. Such reading means may take the form of a feeler which is raised free of the drum just before the latter is advanced a step and is then moved into contact with the drum when the latter is at rest. The feeler engages the successive pattern areas in the series and, whenever a pattern area of a particular type is engaged by the feeler, the latter functions through associated mechanism to cause a changeover in the loom operation. The arrangement of the pattern areas on the drum thus determines the kind of material being produced at a particular time and also the length of time during which the loom will continue to produce that material. When the drum reaches one end of its path of travel, it is automatically reversed, so that the loom being controlled can operate indefinitely without attention. By re-arranging the areas on the drum, the lengths of the sections of the two kinds of material may be varied, as desired, and the construction of the mechanism is such that small variations in the lengths of the sections may be made, as may be desired.

For a better understanding of the invention, reference may be had to the accompanying drawings in which Fig. 1 is a view of the control mechanism as applied to a loom, the parts being shown partly in side elevation and partly in section on the line 1—1 of Fig. 5;

Fig. 2 is a sectional view of the control mechanism on the line 2—2 of Fig. 3;

Figs. 3 and 4 are sectional views on the lines 3—3 and 4—4, respectively, of Fig. 2;

Fig. 5 is a sectional view on the line 5—5 of Fig. 1;

Figs. 6 and 7 are sectional views on the lines 6—6 and 7—7, respectively, of Fig. 5;

Figs. 8 and 9 are elevational views of cams used in that part of the apparatus shown in Fig. 5;

Figure 5:
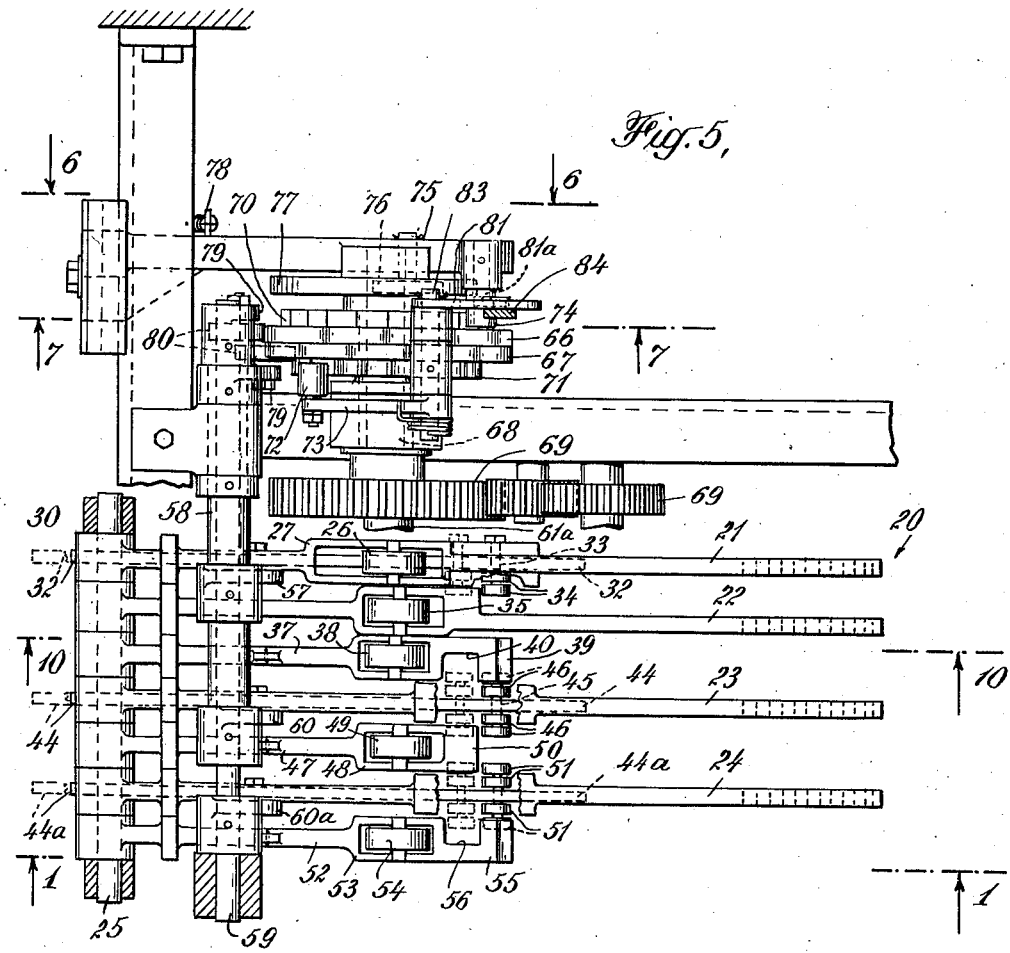
Figure 10:
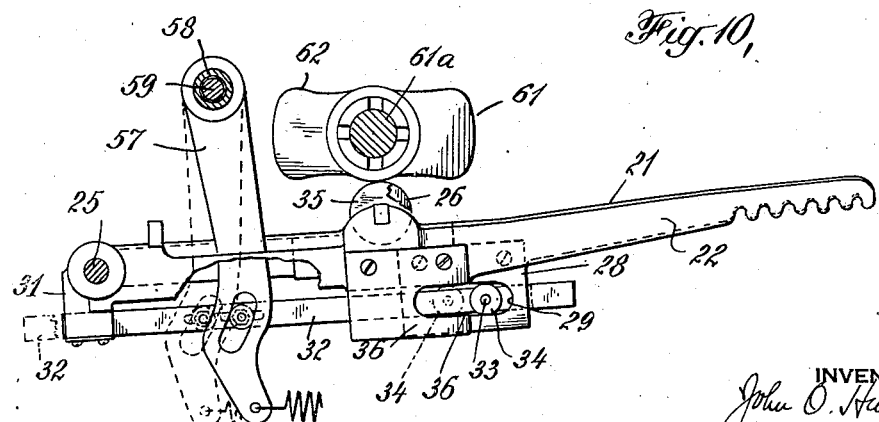
Fig. 10 is a sectional view on the line 10—10 of Fig. 5.

Figs. 11 to 16, inclusive, are views in side elevation of the treadles and associated operating parts.

The control mechanism in the form illustrated is employed for the control of a loom 20 which includes four heddle frames (not shown) connected in the usual way to treadles 21, 22, 23, and 24, mounted for swinging movement on a rod 25 supported on a suitable part of the loom structure. The treadle 21 is provided with a roller 26 mounted at the top of a box 27 in position to be engaged by a cam on the loom cam shaft and the treadle also carries a pair of plates 28 attached to its opposite faces and extending downward, the plates having slots 29 extending lengthwise of the treadle. The hub 30 of the treadle is provided with a depending bracket 31 through which extends a rod 32 and the rod is provided with a pin 33 which extends through the slots in plates 28.

The pin is provided with rollers engaging the walls of the slots and the pin extends outwardly past plate 28 on the side toward treadle 22 and carries a roller 34 (Fig. 5) on its exposed end.

Treadle 22 is provided with a box containing a roller 35 engageable by a cam on the cam shaft and the box is formed with an extension 36 having a recess 36a in such position that, when rod 32 on treadle 21 is moved to the limit of its inward movement toward the hub of the treadle, the roller 34 on pin 33 will lie within the recess. When the parts are in this position, treadles 21 and 22 are connected together and operate as a unit. When pin 33 is in its outermost position, the roller 34 is outside the recess and the treadles are individually operated.

Lying between treadles 22 and 23 is a lever 37 pivotally mounted at one end on rod 25 and provided with a box containing a roller 38 engageable by a cam on the cam shaft. Beyond the box, the lever has an extension 39 formed with a vertical slot 40. The treadle 23 is not equipped with a cam roller but is provided with a pair of depending plates 41 having lengthwise slots 42. At its hub, treadle 23 is provided with a bracket 43 through which extends a rod 44 having a pin 45 extending through the slots 42 in plates 41 and having rollers running on the walls of the slots. The pin 45 projects outwardly beyond both plates and it is provided with rollers 46 at its extreme ends. When rod 44 is moved outwardly so that pin 45 lies at the outer ends of slots 42, the roller 46 at one end of the pin lies beneath the extension 39 on lever 37, so that treadle 23 will be depressed whenever lever 37 is depressed by its cam.

Lever 47 lies between treadles 23 and 24 and is provided with a box 48 in which is mounted a roller 49 engageable by a cam on the cam shaft. The outer end of the box terminates in an extension 50 and, when the pin 45 on rod 44 mounted on treadle 23 is at the outer end of slots 42, one of the rollers 46 on the end of the pin lies outward beyond extension 50. When the rod 44 is moved inward, one roller 46 on the pin lies beneath the extension. At the same time, the roller 46 at the other end of the pin is in alignment with the slot 40 in the extension 39 from lever 37. Thus, by moving rod 44 in or out, the pin 45 serves to connect treadle 23 either to lever 37 or lever 47 to be depressed therewith.

Treadle 24 is of the same construction as treadle 23 in that it has no roller engageable by a cam but is provided with a rod 44a similar to rod 44 and provided with a pin having rollers lying within slots in plates depending from the treadle and also having rollers 51 at its ends outside the plates. When the pin on treadle 24 is in its outer position, the roller 51 at one end lies beyond the end of extension 50 on lever 47; when the pin is at the other end of the slot, the roller 51 lies beneath extension 50 and the treadle is connected to the lever 47 to be depressed therewith.

Next to treadle 24 is a lever 52 provided with a box 53 having a roller 54 engageable by a cam on the cam shaft. The box terminates in an extension 55 provided with a slot 56. When the pin on treadle 24 is in its outer position, one of the rollers 51 on the end of the pin lies beneath the extension 55 on lever 52, so that treadle 24 and lever 52 are depressed together. When the pin on treadle 24 lies at its inner position, the roller 51 on the end of the pin is in registry with the slot 56 on the lever. The arrangement is such, therefore, that when the pin on treadle 24 is in its inner position, the treadle is connected to lever 47 to be depressed thereby and when the pin is in its outer position, the treadle is depressed by lever 52.

The rod 32 mounted on treadle 21 is connected to an arm 57 fast on a tubular shaft 58 mounted in appropriate brackets on a fixed part of the loom frame. Within the tubular shaft is a shaft 59 which extends out of the end of shaft 58 and is provided with a pair of arms 60, 60a which are connected, respectively, to rods 44 and 44a on treadles 23 and 24.

A cam shaft 61a extends over the tops of the rollers on the treadles and levers and this shaft is provided with cams by which the treadles and levers are depressed. Cam 61 acting on the roller on treadle 21 and cam 62 acting on the roller on treadle 22 are the same but 180° out of phase. The cam shaft makes one revolution for each four picks woven into the fabric and cams 61 and 62 are of such form that as the cam shaft rotates, they depress their respective treadles and thus raise the heddles connected thereto one pick out of four. The heddles connected to treadles 21 and 22 may thus be considered to be up for one pick and down for three picks in each cycle of four picks. When treadles 21 and 22 are connected together by pin 33, cams 61 and 62 are both in action and the two treadles are down on alternate picks.

Cam 63 acting on lever 37 has a shape such that the lever is down for three picks and up for one and cam 64 acting on lever 52 has the same shape as cam 63 but is 180° out of phase. Cam 65 acting on lever 47 has a shape such that the lever is alternately up and down for successive picks.

Rods 44 and 44a on treadles 23 and 24 are shifted simultaneously by rocking shaft 59 and when the rods are in their outermost position, so that treadle 23 is connected to lever 37 and treadle 24 connected to lever 52, the treadles are down for three picks and up for one out of each cycle of four picks and are out of step 180°. When the rods 44 and 44a are moved inward, treadles 23 and 24 are both connected to lever 47 and the treadles are then actuated by cam 65 acting on lever 47 and are alternately up and down.

In the weaving of tubular fabric, treadles 21 and 22 are disconnected and treadles 23 and 24 are connected, respectively, to levers 37 and 52. With this arrangement, there are three sets of warp threads controlled by respective heddles at one side of each shed and one set at the other side and the loom produces two webs connected at the selvages to form a tube. When treadles 21 and 22 are connected together and treadles 23 and 24 are connected to lever 47, each shed contains two sets of warp threads at each side and the fabric being woven is plain goods.

The changeover from one type of weaving operation to the other is effected by rocking shafts 58 and 59 and this action is accomplished by means of cams 66, 67 connected together but loose on shaft 68, which is driven through gearing 69 from the main drive shaft of the loom. A ratchet wheel 70 is mounted loosely on shaft 68 and is connected to the cams and at the other side of the cams is a disc 71 which is fast to the cams and loose on the shaft. Disc 71 has peripheral depressions in which may be seated a roller 72 on a spring-pressed arm 73, and the entrance of the roller into one of the depressions serves to prevent overrunning of the ratchet wheel and the cams.

The ratchet wheel is advanced by means of a pawl 74 on a lever 75 pivoted on a suitable part of the loom frame and this lever is provided with a roller 76 held against the surface of a cam 77 on shaft 68 by means of a spring 78 acting on the lever. As the cam rotates, it advances the pawl in two steps per revolution and, in the second step, the pawl, if free to do so, will engage a tooth on the ratchet wheel and advance the wheel and cams 66 and 67 by one step.

The cams control the position of shafts 58 and 59 and, for this purpose, each shaft is provided with an arm 79 carrying a roller 80 bearing against one of the cams. The shape of the cams is such that on each double step in the movement of the ratchet wheel, each cam shifts its shaft 58 or 59 from one position to the other and a change in the actuation of the treadles is effected. The cams, though similar, are slightly offset so that the rocking of shafts 58 and 59, with accompanying movement of rods 32, 44, and 44a, will take place when the treadles or levers are not being depressed by the cams on the cam shaft and the pins on the rods are not undergoing strain.

The shaft 68 operates continually while the loom is running and lever 75 is depressed by cam 77 once per revolution of the shaft. If pawl 74 were permitted to act each time shaft 75 is depressed, the mode of operation of the loom would continually change and the sections of the plain and tubular goods would be extremely short. In order that the sections may be of proper length, the pawl is prevented from acting on the ratchet wheel, except at proper intervals and, for this purpose, the pawl is kept free of the ratchet wheel by a guard 81 which is engageable by a roller 81a mounted on a pawl.

Guard 81 is formed as one end of a lever 82 pivoted on rod 83 supported in any convenient manner, the rod also serving as a pivot for arm 73. The other end of lever 82 is connected by a link 84 to one end of a lever 85, the other end of which is connected to one end of a lever 86. The other end of lever 86 is connected by a link 87 to a lever 88 provided with a feeler 89 cooperating with a drum 90. The drum is formed with an internally threaded hub mounted on the screw threaded portion 91 of a rod 92 rigidly supported in a part of the machine frame. A gear 93 is mounted for rotation on rod 92 and is provided on one face with bosses 94 containing square rods 95 which extend through openings in the solid end of the drum. Gear 93 is driven by a worm wheel 96, the thread of which is so formed that the gear 93 is advanced one tooth for each revolution of wheel 96. As gear 93 rotates with a step by step movement, the drum is similarly rotated stepwise and at the same time moves along the threaded portion of rod 92, so that the drum is given a stepwise rotational and endwise movement.

Worm wheel 96 is mounted on a shaft 97 on which are loosely mounted a pair of bevel gears 98, 99 which are in constant mesh with a gear 100 on a shaft 100a driven in synchronism with the loom. Splined to shaft 97 between gears 98 and 99 is a clutch member 101 which may be moved into contact with one or the other of gears 98, 99. When the clutch member is in contact with one of the gears, that gear is connected through the clutch member to shaft 97 and the shaft is driven from gear 100. By shifting the clutch member from one of the gears 98, 99 to the other, the direction of rotation of shaft 97 and of worm wheel 96 may be reversed.

Drum 90 is provided at one end with a pin 102 which is engageable with an arm 103 on a rock shaft 104 supported in suitable brackets on the frame and provided with an arm 105 connected to clutch member 101. An arm 106 is also mounted on shaft 104 and this arm is provided with a pin 107 entering a slot in an arm 108 loose on the shaft and provided at its outer end with a pin 109. A spring 110 is connected at one end to the pin 109 and at the other end to a bracket 111 on the frame. At its outer end, the drum is provided with a hub 112 on which is adjustably clamped an arm 113 engageable with an arm 114 adjustably mounted on shaft 104.

With the arrangement described, the drum is rotated and advanced longitudinally, for example, to the left in Fig. 3, until arm 113 on the end of the drum strikes arm 114 on shaft 104. This causes shaft 104 to be rocked and clutch member 101 is disengaged from one gear 98, 99 and engaged with the other, spring 110 assisting in throwing the clutch member over and insuring tight engagement with the gear. This action causes a reversal in the direction of rotation of shaft 97, and wheel 96 thereon causes the drum to rotate in the reverse direction, the drum moving endwise along screw 91 in such movement. The reverse movement of the drum continues until pin 102 thereon strikes arm 103 on shaft 104, whereupon clutch member 101 is shifted to the other of gears 98, 99 and the drum begins to move in its original direction.

The feeler lever 88 is provided with an arm 115 having a roller 116 bearing on a cam 117 on shaft 97 and the shape of the cam is such that just before the rib on worm wheel 96 causes gear 93 and drum 90 to advance one step, lever 88 is moved upwardly, so that the feeler 89 is free of the surface of the drum. This upward movement of the feeler causes guard lever 82 to swing counterclockwise on its pivot 83 with guard 81 continuing effective to hold pawl 74 free of ratchet wheel 70. After each advance of the drum one step by rotation of wheel 96, the lever 88 is permitted to descend. If the feeler 89 on the lever engages a solid part of the drum, the movement of lever 88 is arrested without any change in the operation of the pawl guard 81. Whenever a change in the operation of the loom is desired, a hole is bored through the drum at the proper point and when this hole lies beneath the feeler, the feeler enters the hole on the downward movement of lever 88 and this causes lever 82 to be swung, so that the guard 81 moves away from roller 81a on pawl 74. As the pawl is next forced down by the action of cam 77, the pawl engages a tooth of the ratchet and causes the ratchet and cams 66 and 67 to advance one step. As the cams act on shafts 58, 59 to change over the operation of the loom from one type of weave to the other, the position of the holes in the drum and the spacing of the holes determines how long the loom will continue to operate in the production of a given type of fabric and, therefore, the lengths of the sections of the different types of goods.

In the weaving of a fabric of 80 picks to the inch and consisting of alternate sections of tubular and plain goods which may be cut into diapers, each consisting of a long section of tubular material with short end sections of plain goods, the gear 93 may have 100 teeth and be advanced one tooth per four picks woven into the fabric. Each revolution of the drum then represents 400 picks and, if the screw 91 has a pitch of $\tfrac{5}{16}''$ and the drum has a 3" face, the drum will hold about 9.1 convolutions of the helix described by a fixed point thereon as the drum is advanced. As each revolution represents 400 picks, the drum is capable of controlling the weaving of a total or unit length of 45.5" of 80 pick goods. The holes may then be formed in the drum at appropriate intervals to form sections of tubular and plain goods of such lengths as to equal the unit length of 45.5".

In the construction described, the entire face of the drum is employed for control purposes, but, if desired, less than the total face may be employed. For this purpose, the arm 114 is made adjustable along shaft 104 and may be so positioned as to cause a reversal in the direction of rotation of the drum before the entire surface of the drum has passed beneath the feeler. Thus, instead of a unit length of 45.5", the operation of the loom may be so controlled that the unit length, consisting of one section of plain and one section of tubular goods, may be considerably shorter, as, for example, 40". The lengths of the respective sections making up the unit length may be varied as desired by placing the holes at appropriate places on the drum.

The solid areas and the holes on the drum which are brought, respectively, beneath the feeler may be considered pattern areas which are read by the feeler and the feeler then acts in response to those pattern areas to control the operation of the loom and to effect the changeover in operation. The drum is prepared for the weaving of a particular type of goods by forming holes in it at the proper locations and if, at a later time, goods of a different type are to be woven, that is, having plain and tubular sections of lengths different from those of the fabric for which the drum was initially prepared, the original openings in the drum are filled and openings made at the new locations required.

The drum thus serves as a counter which counts off the number of operations of the machine being controlled before causing a changeover in the operation of the machine. In effecting the changeover, the feeler lever acts through the guard to permit the ratchet wheel and pawl to bring the changeover cams into action. In the application of the control to the loom described, the changeover involves a change in the manner of operation of the treadles with a resultant change in the type of fabric being woven.

I claim:

1. A control mechanism for controlling the operation of a loom having a plurality of heddles and means for operating the heddles in different ways to weave different fabrics, comprising a drum having pattern areas arranged thereon along a helical path, means for simultaneously rotating the drum and moving it endwise, means for reading said pattern areas and responsive thereto, and means operating under the control of the reading means in response to said pattern areas and adapted to shift the heddle operating means from one mode of operation to another, said shifting means including a pair of cams, and means controlled by the reading means for rotating the cams.

2. A control mechanism for controlling the operation of a loom having a plurality of heddles and means for operating the heddles in different ways to weave different fabrics, comprising a drum having pattern areas arranged thereon along a helical path, means for simultaneously rotating the drum and moving it endwise in a series of steps, a feeler, means for moving the feeler into contact with the pattern areas successively, and means operating under control of the feeler when in contact with certain pattern areas and adapted to shift the heddle operating means from one mode of operation to another, said shifting means including a pair of cams, and means controlled by the reading means for rotating the cams.

3. A control mechanism for controlling the operation of a loom having a plurality of heddles and means for operating the heddles in different ways to weave different fabrics, comprising a drum having pattern areas arranged thereon along a helical path, means for simultaneously rotating the drum and moving it endwise in a series of steps, means for reversing the action of the rotating and moving means at the ends of the series of steps, a feeler, means for moving the feeler into contact with the pattern areas successively, means operating under control of the feeler when in contact with certain pattern areas and adapted to shift the heddle operating means from one mode of operation to another, said shifting means including a pair of cams, and means controlled by the feeler for rotating the cams.

4. A control mechanism for controlling the operation of a loom having a plurality of heddles and means for operating the heddles in different ways to weave different fabrics, comprising a drum having pattern areas arranged thereon along a helical path, means for simultaneously rotating the drum and moving it endwise in a series of steps, means for reversing the action of the rotating and moving means at the ends of the series of steps, a feeler, means for moving the feeler into contact with the pattern areas successively, means operating under control of the feeler when in contact with certain pattern areas and adapted to shift the heddle operating means from one mode of operation to another, said shifting means including a pair of cams, a ratchet wheel connected to the cams, a pawl for operating the ratchet wheel, and a guard controlled by the feeler for controlling the action of the pawl on the ratchet wheel.

5. A control mechanism for controlling the operation of a loom having a plurality of heddles and means for operating the heddles in different ways to weave different fabrics, comprising a drum having pattern areas arranged thereon along a helical path, means for simultaneously rotating the drum and moving it endwise in a series of steps, means for reversing the action of the rotating and moving means at the ends of the series of steps, means for reading said pattern areas and responsive thereto, and means adapted to shift the heddle operating means from one mode of operation to another, said shifting means including a pair of cams, means controlled by the pattern reading means for rotating the cams, and a pair of rock shafts movable to different positions by the action of the respective cams.

6. A control mechanism for controlling the operation of a loom having a plurality of heddles and means for operating the heddles in different ways to weave different fabrics, comprising a drum having pattern areas arranged thereon along a helical path, means for simultaneously rotating the drum and moving it endwise in a series of steps, means for reversing the action of the rotating and moving means at the ends of the series of steps, means for reading said pattern areas and responsive thereto, and means adapted to shift the heddle operating means from one mode of operation to another, said shifting means including a pair of cams, and means controlled by the pattern reading means for rotating the cams step by step.

7. A control mechanism for controlling the operation of a loom having a plurality of heddles and means for operating the heddles in different ways to weave different fabrics, comprising a drum having pattern areas arranged thereon along a helical path, means for simultaneously rotating the drum and moving it endwise in a series of steps, means for reversing the action of the rotating and moving means at the ends of the series of steps, means for reading said pattern areas and responsive thereto, and means adapted to shift the heddle operating means from one mode of operation to another, said shifting means including a pair of cams, a ratchet wheel connected to the cams, a pawl for operating the ratchet wheel, and means controlled by the pattern reading means for controlling the action of the pawl on the ratchet wheel.

JOHN O. HUNT.